United States Patent
Martin

(10) Patent No.: US 11,212,952 B2
(45) Date of Patent: Jan. 4, 2022

(54) DRIVE OVER MOWER DECK AUTOMATIC LOCKING MECHANISM

(71) Applicant: Deere & Company, Moline, IL (US)

(72) Inventor: Matthew T. Martin, Evans, GA (US)

(73) Assignee: DEERE & COMPANY, Moline, IL (US)

( * ) Notice: Subject to any disclaimer, the term of this patent is extended or adjusted under 35 U.S.C. 154(b) by 203 days.

(21) Appl. No.: 16/543,363

(22) Filed: Aug. 16, 2019

(65) Prior Publication Data

US 2021/0045277 A1    Feb. 18, 2021

(51) Int. Cl.
*A01B 63/104*    (2006.01)
*A01D 34/64*    (2006.01)
*A01D 67/00*    (2006.01)
*A01D 101/00*    (2006.01)

(52) U.S. Cl.
CPC ............ *A01B 63/104* (2013.01); *A01D 34/64* (2013.01); *A01D 67/005* (2013.01); *A01D 2101/00* (2013.01)

(58) Field of Classification Search
CPC ...... A01B 63/104; A01B 71/06; A01D 34/64; A01D 67/005; A01D 2101/00; A01D 34/661
See application file for complete search history.

(56) References Cited

U.S. PATENT DOCUMENTS

| | | | |
|---|---|---|---|
| 3,874,150 A * | 4/1975 | Boeck | A01D 34/74 56/17.1 |
| 4,737,067 A * | 4/1988 | Samejima | A01D 34/64 172/273 |
| 5,025,617 A * | 6/1991 | Kuhn | A01B 59/044 56/15.6 |
| 5,528,889 A * | 6/1996 | Kure | A01D 34/64 56/15.6 |
| 5,816,035 A * | 10/1998 | Schick | A01D 34/74 56/15.2 |
| 5,956,932 A * | 9/1999 | Schmidt | A01D 34/64 56/15.6 |
| 6,293,077 B1 | 9/2001 | Plas et al. | |
| 6,470,660 B1 * | 10/2002 | Buss | A01D 34/64 56/15.9 |
| 6,584,756 B2 * | 7/2003 | Buss | A01D 34/64 56/15.6 |
| 7,240,470 B2 | 7/2007 | Clement et al. | |

(Continued)

FOREIGN PATENT DOCUMENTS

| | | |
|---|---|---|
| EP | 2042016 A2 | 4/2009 |
| EP | 2077067 A1 | 7/2009 |
| JP | 2001258351 A | 9/2001 |

OTHER PUBLICATIONS

European Search Report issued in counterpart application No. 20189618.0 dated Feb. 1, 2021 (07 pages).

*Primary Examiner* — Arpad Fabian-Kovacs

(57) ABSTRACT

A drive over mower deck automatic locking mechanism includes a lift frame engaging a drive over mower deck, and a pair of locking plates pivotably connected to the lift frame. The locking plates lock the drive over mower deck to the lift frame when the lift frame raises the drive over mower deck to a mowing or transport position, and unlock the drive over mower deck from the lift frame when the lift frame lowers the drive over mower deck to an installation position.

11 Claims, 3 Drawing Sheets

(56) References Cited

U.S. PATENT DOCUMENTS

| | | | |
|---|---|---|---|
| 7,596,936 B2 * | 10/2009 | Schick | A01D 34/74 |
| | | | 56/15.9 |
| 7,685,800 B2 | 3/2010 | Sugio et al. | |
| 7,877,972 B2 | 2/2011 | Fox et al. | |
| 7,905,297 B2 | 3/2011 | Fox et al. | |
| 8,234,847 B2 | 8/2012 | Fox et al. | |
| 8,336,281 B2 | 12/2012 | Sugio et al. | |
| 8,720,173 B2 | 5/2014 | Sugio et al. | |
| 9,622,406 B2 | 4/2017 | Tada et al. | |
| 9,693,501 B2 * | 7/2017 | Giere | A01D 34/74 |
| 10,098,279 B2 * | 10/2018 | Zheng | A01D 34/74 |
| 10,827,664 B2 * | 11/2020 | Simpson | A01D 69/002 |
| 2006/0090442 A1 * | 5/2006 | Komiya | A01D 34/74 |
| | | | 56/14.7 |
| 2008/0295477 A1 * | 12/2008 | Porter | A01D 34/64 |
| | | | 56/229 |
| 2009/0077939 A1 * | 3/2009 | Fox | A01B 71/06 |
| | | | 56/15.6 |
| 2009/0078437 A1 * | 3/2009 | Fox | A01B 71/063 |
| | | | 172/74 |
| 2015/0181803 A1 * | 7/2015 | Tada | A01D 34/64 |
| | | | 56/14.9 |

* cited by examiner

DRIVE OVER MOWER DECK AUTOMATIC LOCKING MECHANISM

FIELD OF THE INVENTION

This invention relates to tractors and utility vehicles used for agricultural work and lawn care, and particularly to mid-mounted implements on such tractors or vehicles. More specifically, the invention relates to an automatic locking mechanism for a drive over mower deck.

BACKGROUND OF THE INVENTION

Tractors and utility vehicles used for agricultural work and lawn care may carry a mid-mounted implement such as a mower deck that covers two or more rotary cutting blades on the ends of vertically oriented spindles. U.S. Pat. No. 7,877,972 assigned to Deere & Company of Moline, Ill. relates to a drive over mower deck having a pair of rear draft links that automatically and releasably engage the rear of the mid-mounted implement. The drive over mower deck also includes a forward lift linkage that is pivotably connected to the front end of the implement, and automatically and releasably engages the forward end of the tractor frame. Additionally, a PTO coupling can automatically and releasably engage a tractor PTO to a propeller shaft on an implement.

The drive over mower deck shown in U.S. Pat. No. 7,877,972 requires the operator to lock and unlock the mower deck to the rear draft links. There is a need for a drive over mower deck that may be locked and unlocked without leaving the operator's seat.

SUMMARY OF THE INVENTION

A drive over mower deck automatic locking mechanism includes a lift frame on a tractor that engages a drive over mower deck and lifts the drive over mower deck to any mowing position or transport position above an installation position on the ground surface. A pair of locking plates are pivotably connected to the lift frame and lock a pair of lift rods on the drive over mower deck in a pair of forward facing slots of the lift frame when the drive over mower deck is raised to any mowing position or transport position, and unlock the pair of lift rods from the forward facing slots when the drive over mower deck is in the installation position.

DESCRIPTION OF THE PREFERRED EMBODIMENT

Figure 1:
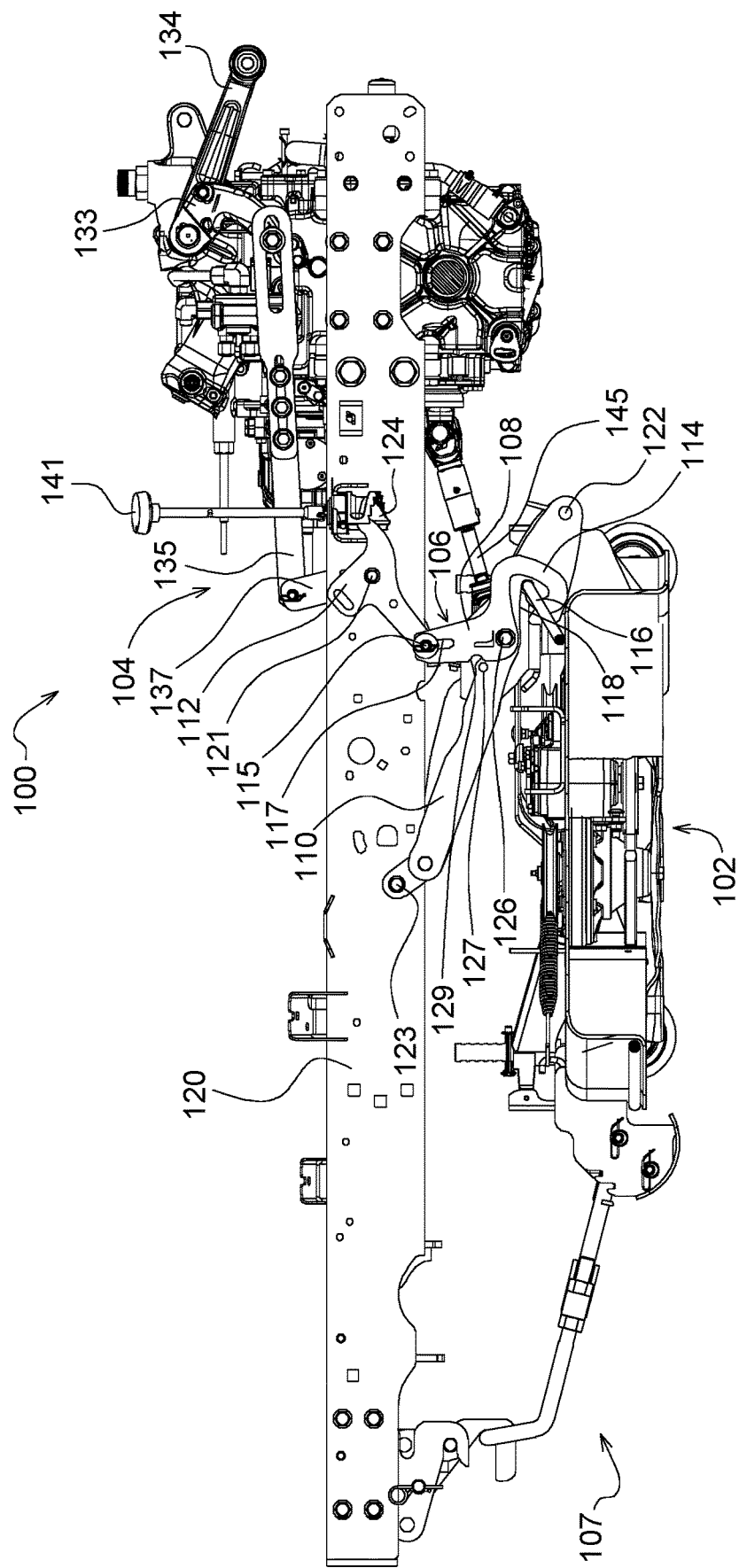
FIG. 1 is a side view of a drive over mower deck automatic locking mechanism that is unlocked in the installation position according to a preferred embodiment of the invention.
Figure 2:
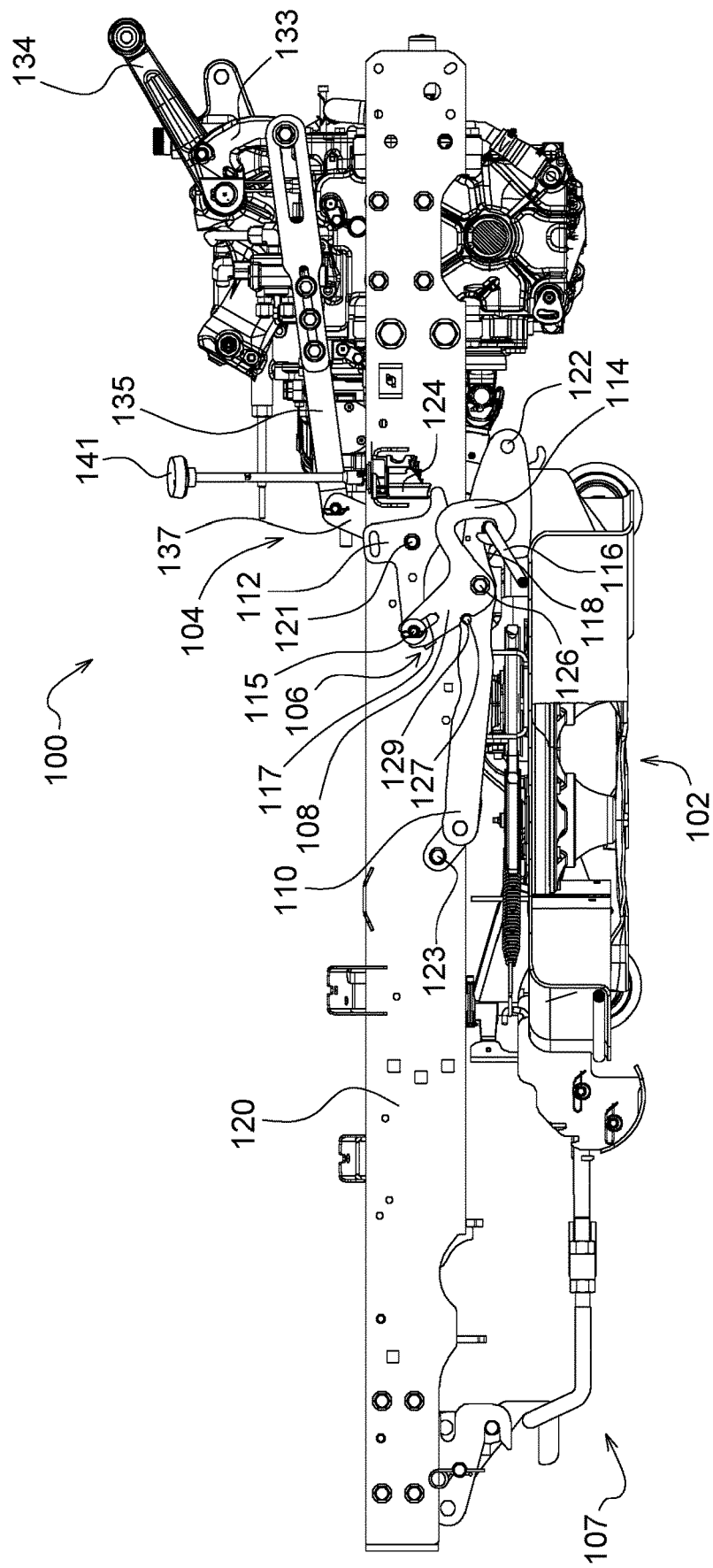
FIG. 2 is a side view of a drive over mower deck automatic locking mechanism that is locked in the mowing or transport position according to a preferred embodiment of the invention.
Figure 3:
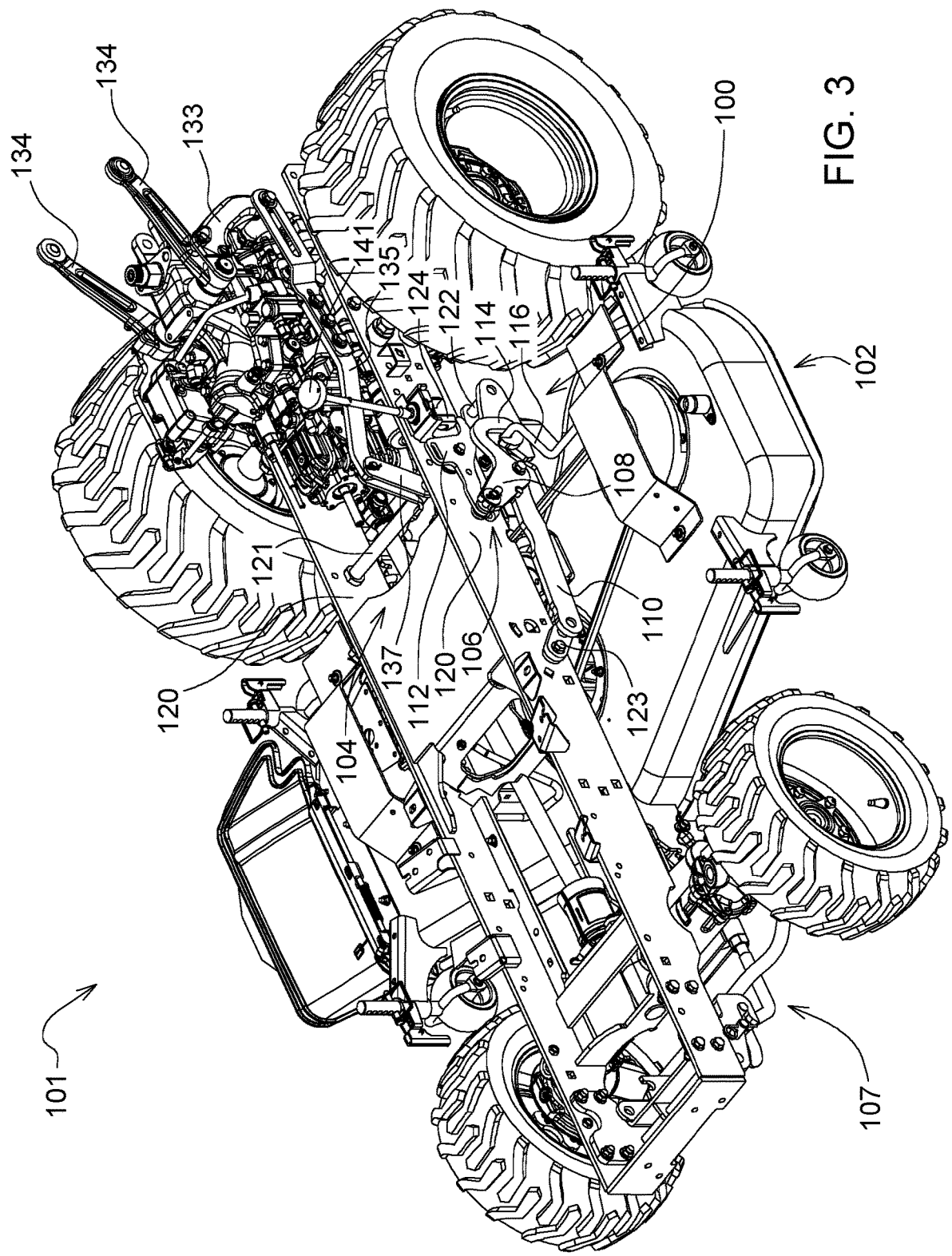
FIG. 3 is a perspective view of a tractor chassis with a drive over mower deck automatic locking mechanism that is locked in the mowing or transport position according to a preferred embodiment of the invention.

In one embodiment shown in FIGS. 1-3, drive over mower deck automatic locking mechanism 100 may be provided on a tractor or utility vehicle 101 used for lawn care with drive over mower deck 102. The drive over mower deck automatic locking mechanism may include a pair of locking plates 106 that may be pivotably connected to lift frame 104 under tractor frame 120. The pair of locking plates may automatically lock the drive over mower deck in any mowing or transport position, and automatically unlock the drive over mower deck in the installation position, without leaving the operator seat. The lift frame may carry the load of the drive over mower deck, and the locking plates prevent the drive over mower deck from being disengaged.

In one embodiment, drive over mower deck automatic locking mechanism 100 may include a pair of locking plates 106, each locking plate having a first or upper portion 108 pivotably connected to crank 112, and a second or lower portion 114 that may be hook-shaped or C-shaped to lock the drive over mower deck to the lift frame, and preferably to one of rear draft links 110. When the drive over mower deck is in the installation position, which may be the drive over mower deck's lowest position on the ground surface, locking plates 106 may allow rear lift rods 116 on the drive over mower deck to move freely in and out of slots 118 in rear draft links 110, as shown in FIG. 1. To reach the installation position, cranks 112 may pivot to lower the drive over mower deck, rear draft links 110 may be lowered to their lowest height relative to the tractor frame, and locking plates 106 automatically unlock. When the drive over mower deck is raised from the installation position to any mowing or transport position, locking plates 106 begin to close. The locking plates close automatically so that the hook-shaped or C-shaped portions capture and lock rear lift rods 116 in slots 118, as shown in FIG. 2. With the drive over mower deck in any mowing or transport position, the locking plates remain locked so that the drive over mower deck cannot be removed.

In one embodiment, drive over mower deck automatic locking mechanism 100 may include locking plates 106 that stay locked when the mower deck is in any mowing or transport position. The angle of the locking plates relative to the rear draft links may change very little as the drive over mower deck is raised or lowered to different cutting or transport heights. The locking plates then may automatically unlock when the angle of the locking plates relative to the rear draft links changes quickly at the drive over mower deck's lowest position. For example, when the rear draft links reach their lowest position, the locking plates may pivot counter clockwise and their angle may change quickly, so that lift rods 116 may be released from slots 118. The rotation point 126 of each locking plate may be in line or close to in line with the line of action between the pivot point 123 where each rear draft link mounts to the tractor frame, and the axis of each rear lift rod 116.

In one embodiment, drive over mower deck automatic locking mechanism 100 may include lift frame 104 having a pair of rear draft links 110. The forward ends of the rear draft links may be connected to longitudinal tractor frame members 120 at pivot points 123. The rear ends of the rear draft links may be connected together by cross shaft 122. Locking plates 106 may be pivotably connected to the rear draft links at rotation points 126. Slots 118 in the rear draft links may be forward facing and may be located adjacent and behind rotation points 126. The slots in the rear draft links may be positioned to engage rear lift rods 116 on the top surface of the drive over mower deck as the tractor or vehicle drives over the drive over mower deck. The rear draft links, along with forward lift linkage 107, may be used to engage and pick up the drive over mower deck when driving over the drive over mower deck. The rear draft links also may help support PTO shaft 145 in position to connect to the drive over mower deck as the tractor or vehicle drives over it.

In one embodiment, drive over mower deck automatic locking mechanism 100 may include lift frame 104 having a pair of cranks 112 connected together by cross shaft 121 between longitudinal frame members 120. The operator may lift and lower the drive over mower deck by pivoting the cranks using hydraulic, electric or manual controls. For example, the operator may lift and lower the drive over mower deck using hydraulic, electric or manual controls for pivoting rock shaft lift arms 134, which may be connected to cross shaft 121 by a linkage including bell crank 133, arm 135 and bell crank 137. Alternatively, the operator may lift and lower the drive over mower deck using a pedal or lever connected directly or indirectly to cross shaft 121. The operator may set the height of the drive over mower deck at any position where one of cranks 112 engages or rests on stepped height of cut cam 124. The operator may change the height of cut by turning height of cut knob 141 when the drive over mower deck is raised so that the crank is off the height of cut cam The operator may unlock the drive over mower deck in the installation position by turning the height of cut knob until crank 112 engages a slot at the lowest step of the height of cut cam. When the crank 112 engages any other steps of the height of cut cam, at any mowing or transport height, the locking plates cannot pivot far enough to disengage rear lift rods 116. Slot 117 also may be provided in locking plate 106 for pivot connection 115 between locking plate 106 and crank 112, allowing the locking plate to rise up over bumps encountered by the drive over mower deck.

Having described the preferred embodiment, it will become apparent that various modifications can be made without departing from the scope of the invention as defined in the accompanying claims.

The invention claimed is:

1. A drive over mower deck automatic locking mechanism, comprising:
   a lift frame engaging and lifting a drive over mower deck by driving over the drive mower deck; and
   a pair of locking plates pivotably connected to the lift frame; the locking plates automatically locking the drive over mower deck to the lift frame when the drive over mower deck is at any of a plurality of mowing or transport heights, and automatically releasing the drive over mower deck from the lift frame when the drive over mower deck is at an installation position below the plurality of mowing or transport heights.

2. The drive over mower deck automatic locking mechanism of claim 1 wherein each locking plate includes a C-shaped portion that holds a rear lift rod on the drive over mower deck in a forward facing slot in the lift frame.

3. The drive over mower deck automatic locking mechanism of claim 1 wherein each locking plate includes a hook shaped portion that holds a rear lift rod on the drive over mower deck in a forward facing slot in the lift frame.

4. The drive over mower deck automatic locking mechanism of claim 1 wherein the pair of locking plates are pivotably mounted to a pair of rear draft links.

5. A drive over mower deck automatic locking mechanism, comprising:
   a pair of locking plates pivotably connected to a pair of rear draft links under a tractor frame;
   the pair of locking plates automatically pivoting sufficiently relative to the pair of rear draft links to unlock a drive over mower deck from the pair of rear draft links when the drive over mower deck is at a lowest position for installation; and
   the pair of locking plates automatically pivoting insufficiently relative to the pair of rear draft links to unlock the drive over mower deck from the pair of rear draft links when the drive over mower deck is lifted to a mowing or transport position.

6. The drive over mower deck automatic locking mechanism of claim 5 wherein each of the pair of locking plates includes a C-shaped portion that holds a rod on the drive over mower deck in a slot in each of the pair of rear draft links.

7. The drive over mower deck automatic locking mechanism of claim 5 wherein each of the pair of locking plates includes a hook-shaped portion to hold a rod on the drive over mower deck in a slot in each of the pair of rear draft links.

8. The drive over mower deck automatic locking mechanism of claim 5 further comprising a slot in each of the pair of locking plates to allow the locking plate to rise above a mowing position when the drive over mower deck encounters a bump.

9. A drive over mower deck automatic locking mechanism, comprising:
   a lift frame on a tractor that engages a drive over mower deck and lifts the drive over mower deck to any mowing position or transport position above an installation position on the ground surface;
   a pair of locking plates pivotably connected to the lift frame that lock a pair of lift rods on the drive over mower deck in a pair of forward facing slots of the lift frame when the drive over mower deck is lifted to any of a plurality of mowing or transport heights, and the pair of locking plates pivoting sufficiently to unlock the pair of lift rods from the forward facing slots when the drive over deck is in the installation position.

10. The drive over mower deck automatic locking mechanism of claim 9 wherein the pair of locking plates do not pivot out of their locked positions when the lift frame moves the drive over mower deck between mowing or transport positions.

11. The drive over mower deck automatic locking mechanism of claim 9 wherein each of the pair of locking plates is connected to a crank that pivots to raise and lower the drive over mower deck to a height where the crank engages a stepped height of cut cam.

\* \* \* \* \*